Feb. 21, 1950 J. A. CAMPBELL 2,498,483
SAFETY CONTROL APPARATUS
Filed Sept. 20, 1945

INVENTOR
James A. Campbell
BY
ATTORNEY

Patented Feb. 21, 1950

2,498,483

UNITED STATES PATENT OFFICE 2,498,483

SAFETY CONTROL APPARATUS

James A. Campbell, Wilmette, Ill., assignor to The Westinghouse Air Brake Company, Wilmerding, Pa., a corporation of Pennsylvania Application September 20, 1945, Serial No. 617,471

2 Claims. (Cl. 121—38)

This invention relates to control apparatus and more particularly to fluid pressure apparatus for controlling the positioning of a device.

One object of the invention is the provision of an improved apparatus of the above type.

Another object of the invention is the provision of an improved control apparatus embodying an operator's fluid pressure control device and a fluid pressure controlled positioning motor which is automatically operable to position means being controlled by said motor in accordance with the operation of said control device, which may be located at a remote control station.

Another object of the invention is the provision of an apparatus such as defined above embodying means which is automatically operative, in case of failure of the supply of fluid under pressure, to cause operation of the motor to move the means being controlled to a chosen position.

Other objects and advantages will be apparent from the following more detailed description of the invention.

Figure 1:
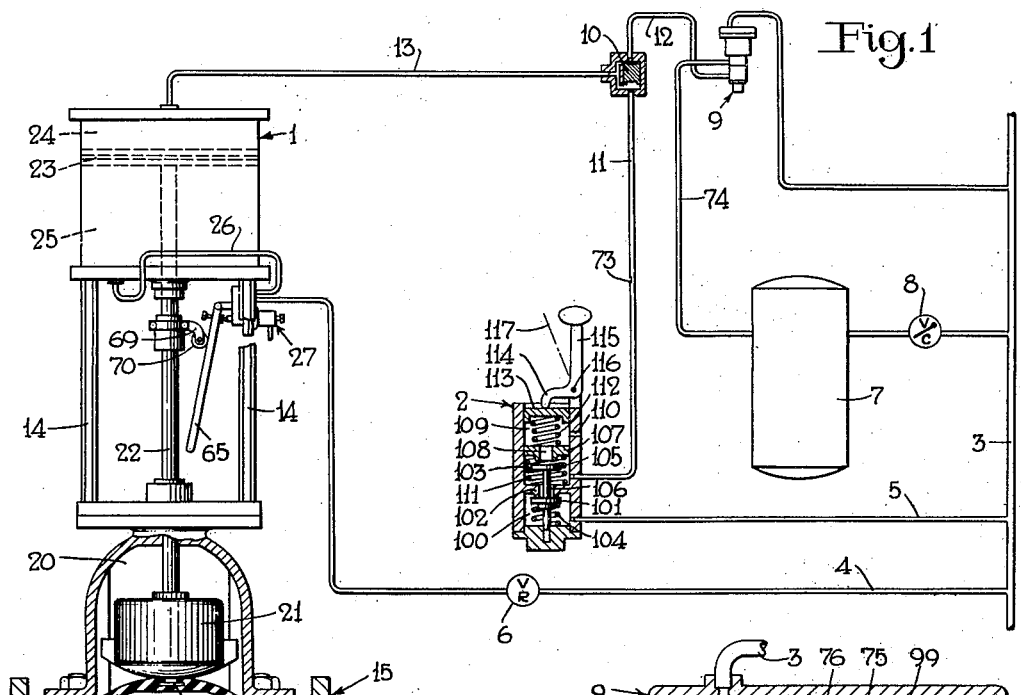
Figure 2:
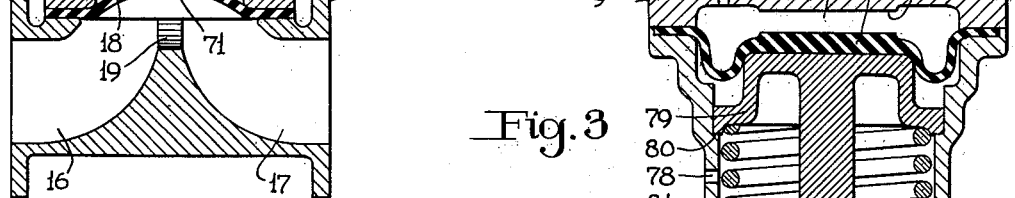
Figure 3:
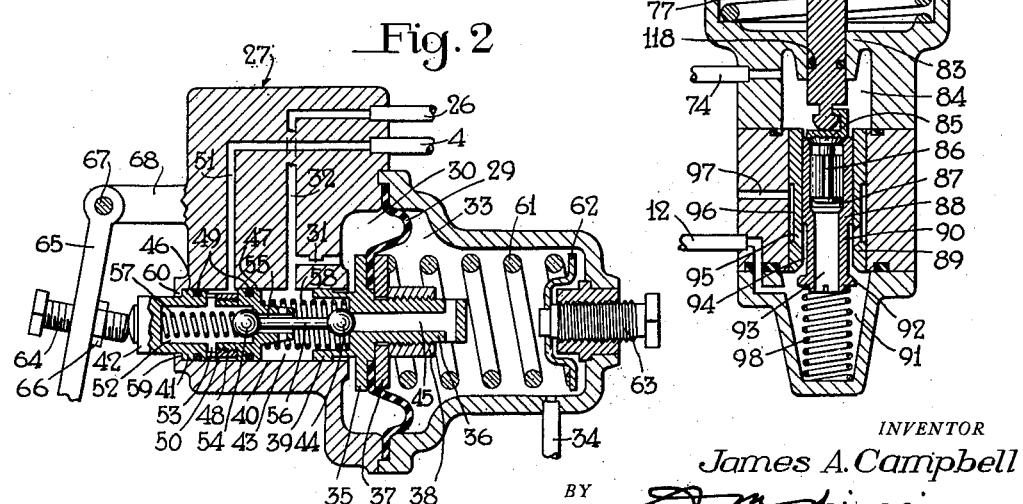

In the accompanying drawing; Fig. 1 is a diagrammatic view, partly in section and partly in outline, of a control apparatus embodying the invention; and Figs. 2 and 3 are sectional views of two valve devices shown in elevation in Fig. 1.

Description

As shown in the drawing, the improved control apparatus comprises a fluid motor 1; an operator's control device 2 for normally controlling operation of said motor and which device may be located at a station remote from said motor if desired; a source of fluid under pressure, such as a fluid pressure supply pipe 3 which is connected by pipes 4 and 5 to said motor and control device, respectively; a reducing valve device 6 arranged in pipe 4 and operative to maintain at said motor a constant reduced pressure below that in said supply pipe; a safety reservoir 7 adapted to be normally charged with fluid under pressure from the supply pipe 3 through a pipe containing a check valve 8; a safety valve device 9; and a double check valve 10 arranged to control communication between pipes 11 and 12 connected, respectively, to the operator's control device 2 and to the safety valve device 9, and a motor control pipe 13 leading to the fluid motor 1.

The fluid motor 1 comprises a casing connected to and supported by a plurality of rods 14 carried by a device 15 which it is desired to control by said motor. For the purpose of illustration, the device 15 may be in the form of a control valve device for controlling flow of fluid and comprises a casing having inlet and outlet openings 16 and 17, respectively, and a valve in the form of a flexible diaphragm 18 arranged to cooperate with a seat 19 in said casing for closing communication between said openings. The diaphragm valve 18 is shown in the drawing in a fully open position to provide a maximum degree of flow of fluid from the opening 16 to the opening 17, and adjustment of said diaphragm between this position and its closed position will throttle the flow of fluid between said openings. At the side of diaphragm valve 18 opposite the valve seat 19 is a chamber 20 containing a plunger 21 operatively connected to said diaphragm valve by a member 71 and having a convex face adapted to engage said diaphragm valve. The plunger 21 is connected to a control rod 22 which extends through the casing of device 15 and into the casing of the fluid motor 1. Vertical adjustment of the control rod 22 and plunger 21 will move the diaphragm valve 18 to the fully open position in which it is shown in the drawing, to the closed position in contact with seat 19, or to any intermediate throttling position, as will be evident.

In the fluid motor 1 the rod 22 is connected to a piston 23. At one side of piston 23 is a control chamber 24 connected to the motor control pipe 13. At the opposite side of piston 23 is a chamber 25 connected by a pipe 26 to a valve device 27 which is mounted on the casing of the fluid motor.

The valve device 27 comprises (Fig. 2) a casing containing a flexible diaphragm 29 having at one side a chamber 30 which is open through a restricted port 31 to a passage 32 one end of which is connected to pipe 26. At the opposite side of diaphragm 29 is a chamber 33 which is open to atmosphere through a pipe 34. A diaphragm follower 35 contained in chamber 30 and engaging one side of diaphragm 29 has a screw-threaded stud 36 extending through a central opening in the diaphragm into chamber 33. A follower 37 in chamber 33 engages the opposite side of diaphragm 29, and a nut 38 on stud 36 is tightened against the follower 34 and clamps the central portion of said diaphragm between said follower and the follower 35.

The follower 35 has a sleeve-like extension 39 slidably mounted in a bore 40 provided in the casing in coaxial relation with diaphragm 29. Also slidably mounted in this bore beyond the extension 39 is a piston 41 having an operating rod 42 projecting through an opening in the casing to the exterior thereof. Between the sleeve-like extension 39 and piston 41 is a chamber 43 open to passage 32 and containing a release valve 44 disposed within the sleeve-like extension 39 and arranged to cooperate with a seat provided on the follower 35 around a passage 45 which extends through the stud 36 and opens to chamber 33.

The piston 41 comprises two parts 46 and 47 secured together by screw-threads 48. Each of the piston parts 46 and 47 carries a sealing ring 49 having sliding contact with the wall of bore 40, and said parts cooperate to form exteriorly of the piston an annular chamber 50 between the two sealing rings 49. Chamber 50 is connected by a passage 51 to the fluid pressure supply pipe 4, whereby said chamber is adapted to be constantly supplied with fluid at the reduced pressure provided by the reducing valve device 6. The sealing rings 49 prevent leakage of fluid under pressure from chamber 50.

The two piston parts 46 and 47 also cooperate to form within the piston 41 a chamber 52 which is open through one or more radial ports 53 to the annular chamber 50. A supply valve 54 contained in chamber 52 is adapted to cooperate with a seat on the piston part 47 for controlling communication between said chamber and a bore 55 extending through the piston part 47 and opening to chamber 43. A stem 56 of smaller diameter than bore 55 is connected at one end to the supply valve 54 and at the opposite end to the release valve 44 whereby said valves are movable in unison. A bias spring 57 in chamber 52 acts on the supply valve 54 urging it toward its seat. A spring 58 in chamber 43 is interposed between the sleeve-like extension 39 and the piston part 47 and is provided to urge the piston 41 in a direction away from the diaphragm 29. The piston rod 42 is of smaller diameter than piston 41 in order to provide a stop shoulder 59 arranged to be engaged by an overlying shoulder 60 on the casing for limiting outward movement of the piston 41 by spring 58.

Chamber 33 contains a control spring 61 one end of which bears against the diaphragm follower 37. The opposite end of spring 61 is supported on a follower 62 which in turn is supported by an adjusting screw 63 having screw-threaded engagement with the casing. By suitable adjustment of screw 63 any desired pressure of spring 61 against the diaphragm follower 37 may be obtained.

The piston rod 42 engages one end of a screw 64 which is adjustably mounted in an operating cam or lever 65. A lock nut 66 on screw 64 is provided for contact with lever 65 to secure said screw in an adjusted position. One end of lever 65 is fulcrumed on a pin 67 which is carried in an arm 68 projecting from the casing. By reference to Fig. 1 it will be noted that the lever 65 is located at one side of the motor control rod 22 and extends longitudinally but diagonally with respect to said rod. An operating arm 69 is rigidly secured to the operating rod 22 and is provided in its end with a roller 70 adapted to roll on the valve operating lever 65. Movement of piston 23 in the fluid motor 1 in a downwardly direction, from the position in which it is shown in the drawing, will act through the arm 69 and roller 70 to rock the operating lever 65 in a counter-clockwise direction, while movement of said piston in the opposite direction will permit rocking of said lever 65 in a clockwise direction.

The operator's control device 2 is operated to control, through pipes 11 and 13, the supply and release of fluid under pressure to and from the motor piston chamber 24, and comprises a casing having a chamber 100 open to the supply pipe 5 and containing a supply valve 101 arranged to cooperate with a valve seat 102 to control communication between said chamber and a chamber 103 which is open to pipe 11. A bias spring 104 in chamber 100 acts on the supply valve to urge it toward its seat.

A release valve 105 contained in chamber 103 is provided on one end of a stem 106 which is connected to the supply valve 101 so that said valves are movable in unison. The release valve 105 is arranged to cooperate with a seat provided on one face of a fluid pressure controlled plunger 107 which is slidably mounted in the casing and subject on one side to pressure of fluid in chamber 103. The valve seat on plunger 107 encircles a fluid pressure release passage 108 extending through said plunger and opening to a chamber 109 which in turn is open to atmosphere through a port 110. A bias spring 111 in chamber 103 acts on plunger 107 to urge it out of contact with the release valve 105.

A regulating spring 112 contained in chamber 109 bears at one end on plunger 107 while the opposite end bears against one side of a control plunger 113 slidably mounted in the casing. The opposite side of plunger 113 is engaged by a finger 114 projecting from an operator's control lever 115 which is pivotally mounted on a pin 116 carried by the casing. The lever 115 has a normal position in which it is shown in the drawing, a maximum pressure position designated by a dot-dash line 117 and is adjustable to any position intermediate said normal and maximum pressure positions.

In operation, let it be assumed that the operator's control lever 115 is initially in the normal position in which it is shown in the drawing, which will permit movement of plunger 113 by regulating spring 112 to a position in which the pressure of said spring on plunger 107 is so reduced as to permit spring 104 to seat the supply valve 101 and spring 111 to move plunger 107 out of seating engagement with the release valve 105. With the release valve 105 open, chamber 103 and pipe 11 will be open to atmosphere through port 110. Let it further be assumed that the double check valve 110 is in the position in which it is shown in the drawing establishing communication between pipes 11 and 13. With pipe 11 open to atmosphere as just mentioned, the control chamber 24 in the motor 1 will also be open to atmosphere.

Let it further be assumed that pipe 3 is charged with fluid under pressure from any suitable source, due to which, chamber 100 will be supplied with fluid under pressure from said pipe through pipe 5, and the supply valve chamber 52 in the control valve device 27 will be charged with fluid from pipe 3 at the reduced pressure provided by the reducing valve device 6.

Let it further be assumed that the motor piston 23 is in the position in which it is shown in the drawing and that with the operating lever 65 for the valve device 27 in contact with roller 70 carried by the operating rod 22, the adjusting screw 64 is regulated to position the piston 41 so that shoulder 59 on said piston will be just in contact with or slightly out of contact with the shoulder 60 on the casing. The adjusting screw 63 will then be operated to adjust the force of spring 61 against the diaphragm 29 to a degree which will deflect said diaphragm in the direction of piston 41. This movement of diaphragm 29 against the seated release valve 44 and opposing force of spring 58 will operate pin 56 to open the supply valve 54 whereupon fluid under pressure will be permitted to flow from pipe 4 through chambers 50, 52, and 43 to passage 32 and thence through pipe 26 to chamber 25 below the motor piston 23. Fluid at the pressure thus provided in chamber 25 below the motor piston 23 will also flow through the restricted port 31 to chamber 30 and therein act on diaphragm 29 against the opposing force of spring 61. When the pressure of fluid thus obtained in the motor piston chamber 25 and in diaphragm chamber 30 become sufficient to overcome the opposing force of the regulating spring 61, the diaphragm 29 will move against the pressure of said spring. As the diaphragm thus moves, the release valve 44 will be maintained in contact with its seat and the supply valve 54 will move toward its seat under the force of spring 57 until said supply valve becomes seated to prevent further flow of fluid under pressure to piston chamber 25 of the motor 1 and to diaphragm chamber 30, whereupon movement of the diaphragm 29 will cease. The pressure of fluid thus obtained in chambers 25 and 30 will be limited in accordance with the force of spring 61 against diaphragm 29, as controlled by the adjustment of screw 63, and any desired degree of pressure may be obtained in chamber 25 by suitable adjustment of said screw, as will be evident. The pressure of fluid thus provided in chamber 25 at one side of the power piston 23 is such as to insure movement of said piston to the position in which it is shown in the drawing for thereby moving the device being controlled to a corresponding position, which in the disclosure, consists of moving the diaphragm valve 28 of the device 15 to its fully open position.

If the operator should now desire to move the device being controlled to an opposite extreme position, such as to move the diaphragm valve 18 into contact with its seat 19, he will move the control lever 115 to the maximum pressure position indicated by the dot and dash line 117.

This movement of lever 115 will displace plunger 113 against the adjacent end of spring 112 and increase the pressure of said spring on plunger 107 to such a degree as to move said plunger into seating engagement with the release valve 105 and then actuate said valve to open the supply valve 101. Fluid under pressure will then flow from the supply pipe 3 to pipe 11 and thence past the double check valve 10 and through pipe 13 to chamber 24 in the motor 1. The pressure of fluid thus provided in motor 1 is also effective in chamber 103 in the operator's control device 2 on plunger 107 and when said pressure becomes sufficient, the plunger 107 will move against the regulating spring 112, and permit movement of the supply valve 101 by spring 104 in the direction of its seat. The supply valve 101 may finally move into contact with its seat when the pressure in the motor chamber 24 is increased to a degree in excess of that provided by the reducing valve device 6, or if desired, the pressure of the regulating spring 112 may be such as to prevent sufficient movement of plunger 107 by the pressure of fluid in pipe 3 to permit closing of the supply valve when the operator's control lever is in its maximum pressure position. Regardless of this, the pressure of fluid provided in motor chamber 24 when the operator's control lever 115 is in its maximum pressure position will move the motor piston 23 and rod 22 downwardly and move the diaphragm valve 18 to its closed position in contact with seat 19.

As the piston 23 and rod 22 move in a downward direction as just mentioned, the arm 69 and roller 70 will rock the valve operating lever 65 in a counterclockwise direction and thereby move piston 41 in the valve device 27 in the direction of the diaphragm 29. With the release valve 44 seated against the diaphragm follower 35, this movement of piston 41 will be relative to said valve and also to the connected supply valve 54, so as to thereby open communication past said supply valve between the fluid pressure supply pipe 4 and pipe 26 leading to chamber 25 below the motor piston 23.

Fluid under pressure thus provided in piston chamber 25 will also be effective through choke 31 in chamber 30 on the diaphragm 29 to deflect said diaphragm against spring 61 as the pressure of said fluid is increased. This deflection of diaphragm 29 against spring 61 will permit movement of the release and supply valves 44 and 54, respectively, with said diaphragm, but as long as piston 41 is in motion under the action of fluid pressure effective in chamber 24, said piston will maintain the supply valve 54 open. Fluid under pressure will thus continue to flow to pressure chamber 25 until movement of the motor piston 23 and piston 41 ceases in the closed position of the diaphragm valve 18. As soon as the motor piston 23 and piston 41 in the valve device 27 stops moving however, deflection of diaphragm 29 against the pressure of spring 61, by the continuing increase in pressure of fluid in piston chamber 25 and in diaphragm chamber 30, will be relative to piston 41 and will permit the closing of the supply valve 54 by spring 57, so as to prevent further flow of fluid under pressure to said chambers. The parts of the apparatus are so adjusted however with respect to the pressure of fluid provided in the motor chamber 24 by the operator's control valve device 2 when lever 115 is in the maximum pressure position, as to insure movement of diaphragm valve 18 into contact with seat 19 against the pressure of fluid provided in chamber 25 and the opposing force of the device being actuated, such as the force opposing movement of the diaphragm valve 18 toward its seat 19.

If the operator now desires to move the diaphragm valve 18 to its fully open position, he will move lever 115 to its normal position in which it is shown in the drawing. This movement will reduce the pressure of regulating spring 112 on the plunger 107 to such a degree as to permit movement of said plunger by spring 111 to the position in which it is shown in the drawing and in which it is out of engagement with the release valve 105. With the release valve 105 thus open, fluid under pressure will be completely released from the motor piston chamber 24 to atmosphere. The pressure of fluid in the motor piston chamber 25 will then move piston 23 and the diaphragm valve 18 to the fully open position in which they are shown in the drawing.

As the motor piston 23 is thus moved to the position in which it is shown in the drawing, the operating rod 22 and roller 70 will be operated to permit the pressure of fluid in chamber 43 acting on piston 41 plus the pressure of spring 58 to return said piston and the operating lever 65 to their normal positions. As the piston 41 is thus returned to its normal position it will act through the seated supply valve 54 to unseat the release valve 44 to thereby permit release of fluid under pressure from the motor chamber 25 and from the diaphragm chamber 30. As the pressure of fluid in chambers 25 and 30 is thus reduced, the diaphragm 29 will be deflected relative to and in the direction of the release valve 44 by the regulating spring 61. When the pressure of fluid in the motor chamber 25 and in diaphragm chamber 30 then become reduced to the chosen low degree above mentioned, the diaphragm follower 35 will seat against the release valve 44 to prevent further release of fluid under pressure from said chamber.

It will be noted that in moving the diaphragm valve 18 into contact with its seat 19, the valve device 27 acts to increase the pressure of fluid in chamber 25, but such pressure is without effect since closing movement of the valve is insured by the pressure of fluid provided in chamber 24, with the operator's control lever 115 in the maximum pressure position designated by the dot-dash line 117, but the fluid pressure provided by said valve device in chamber 25 acts to effect operation of piston 23 to move the diaphragm valve 18 to its fully open position when the power piston chamber 24 is open to atmosphere.

A further purpose of the valve device 27 is to provide fluid in chamber 25 at sufficient pressure to stop movement of piston 23 in any position intermediate its valve fully open and valve closed positions, as selected by the position of the operator's control lever 115 between the position in which it is shown in the drawing and that indicated by the dot-dash line 117, whereby the diaphragm valve 18 may be adjusted to provide any desired degree of throttling of flow of fluid from inlet 16 to the outlet opening 17, as will now be described.

Assume that the operator desires to move the diaphragm valve 18 to a position midway between its fully open position and its closed position in contact with seat 19. To accomplish this, the operator will move lever 115 to a position, for instance, substantially midway between the normal position in which it is shown in the drawing and the maximum pressure position indicated by the dot-dash line 117.

This operation of lever 115 will affect a corresponding displacement of plunger 113 and of the adjacent end of the regulating spring 112 which will effect movement of plunger 107 into contact with the release valve 105 and then actuate said valve to unseat the supply valve 101. Fluid under pressure will then flow from pipe 5 to the motor piston chamber 24, and when the pressure of such fluid acting in chamber 103 on plunger 107 is increased sufficiently it will move said plunger against spring 112. As plunger 107 is thus moved against spring 112, the spring 104 will move the supply valve 101 toward its seat and such movement will continue until said valve engages its seat to prevent further flow of fluid under pressure to chamber 103 and to the motor piston chamber 24. It will thus be seen that the pressure of fluid in the motor piston chamber 23 will be increased to a selected degree, corresponding to the position of the operator's control lever. The selected pressure of fluid thus provided in the motor chamber 24 will initially exceed the reduced pressure of fluid in chamber 25 and will therefore cause the piston 23 to start moving in a downward direction against said opposing pressure and the opposing force of the device being operated, such as pressure of fluid in the inlet opening 16 acting on the diaphragm valve 18.

As the piston 23 and control rod 22 are thus moved in a downwardly direction, the roller 70 will act to rock lever 65 in a counterclockwise direction to move piston 41 in the valve device 27 in the direction of diaphragm 29 to open the fluid pressure supply valve 54. Fluid under pressure will then flow past the supply valve 54 to chamber 43 and thence through passage 32 and pipe 26 to chamber 25 below the motor piston 23 and also from passage 32 to chamber 30 at one side of diaphragm 29 and this pressure acting on said diaphragm will deflect same against the pressure of spring 61, whereby, immediately after opening of the supply valve 54, said diaphragm will start to move substantially with the piston 41, and said valve will remain open as long as said piston continues to move. Thus, as the motor piston 23 is moved downwardly, the pressure of fluid in power chamber 25 will increase and when it becomes increased to a degree, which acting in conjunction with the force from the diaphragm valve 18, is sufficient to counterbalance the effect of opposing pressure of fluid in chamber 24, the piston 23 will cease moving in a position, it will be noted corresponding substantially to the pressure of fluid provided in chamber 24, and hence in accordance with the position of the operator's control lever.

As soon as the motor piston 23 ceases movement, as just described, the piston 41 will also stop, but a slight flow of fluid past the still open supply valve 54 to the motor piston chamber 25 and to diaphragm chamber 30 will continue. Consequently the diaphragm 29 will continue to deflect against the pressure of spring 61 after piston 41 stops moving in order to effect closure of the supply valve 54 to thereby limit the pressure of fluid obtained in chamber 25 to a degree only slightly greater than effective at the time the motor piston 23 stopped, but insufficient to initiate reverse movement of piston 23 against the pressure in chamber 24. In order to insure that the pressure of fluid in chamber 25 will not increase to a degree which would tend to initiate movement of piston 23 against the selected pressure of fluid provided in chamber 24, a choke 73 may be provided in pipe 11 to so restrict the rate of flow of fluid under pressure to chamber 24, that the valve device 27 will operate to increase the pressure of fluid in chamber 25 substantially in proportion to the movement of piston 23, whereby the pressure of fluid required in chamber 25 to stop movement of said piston in the selected position will be obtained substantially at the time said piston obtains said selected position.

If the operator desires to move the diaphragm valve 18 to effect a greater degree of throttling of the flow of fluid from inlet opening 16 to outlet opening 17, he will move lever 115 further in the direction of the maximum pressure position, indicated by the dot and dash line 117, to effect a corresponding increase in pressure of fluid in the power piston chamber 24. This increase in pressure in chamber 24 over that effective in chamber 25 will then move piston 23 further in a downward direction and the valve device 27 will again operate to increase the pressure of fluid in chamber 25. The pressure of fluid in chamber 25 will then become increased to the degree required for stopping the piston 23 substantially in the position for providing the desired throttling of flow of fluid through the valve device 15, as will be apparent from the above description.

On the other hand, if the diaphragm valve 18 is in contact with its seat 19 or is in a partially open position and the operator desires to increase the flow of fluid from the inlet opening 16 to the outlet opening 17, he will adjust lever 115 in the direction of its normal position to thereby reduce the pressure of spring 112 on the plunger 107. The pressure of fluid in chamber 103 will then move plunger 107 out of contact with release valve 105, whereupon fluid under pressure will be released from the motor piston chamber 24. As the pressure of fluid in chambers 24 and 103 is thus reduced, spring 112 will gradually move plunger back in the direction of the release valve 105, and finally into contact with said valve when said pressure becomes reduced to a degree corresponding to the position of the operator's control lever 115.

When the pressure in the motor piston chamber 24 is thus reduced, the pressure of fluid in chamber 25, aided by pressure of fluid from the inlet opening 16 acting on diaphragm valve 18 will move the piston 23 upwardly. This movement of piston 23 will permit operation of lever 65 and piston 41 in the valve device 27 in a direction away from the diaphragm 29 by pressure of fluid effective in chamber 43 plus the pressure of spring 58. This movement of piston 41 will initially be relative to the diaphragm 29 and open the release valve 44, whereupon fluid under pressure will be released from the power piston chamber 25 and from diaphragm chamber 30. As the pressure of fluid in chamber 30 is thus reduced, spring 61 will deflect the diaphragm 29 in the direction toward the release valve 44, but said valve will remain out of contact with its seat as long as the piston 41 is moving in a direction away from said diaphragm. However, substantially as soon as the power piston attains the position selected by the reduced pressure of fluid in chamber 24, the pressure of fluid in chambers 25 and 43 will have become reduced past the release valve 44 to a degree which will permit said piston to be stopped by the pressure of fluid in chamber 24. After the power piston 23 and thereby piston 41 in the valve device 27 stops moving, as just mentioned, a slight further reduction in pressure of fluid in chamber 25 and diaphragm chamber 30 past the release valve 44 will permit spring 61 to continue deflection of diaphragm 29 sufficiently to move the diaphragm follower 35 into contact with said valve, to thereby prevent further release of fluid under pressure from said chambers. The pressure of fluid in the power piston chamber 25 will thus be reduced only to a degree sufficient to allow stopping of the power piston 23 and thereby the diaphragm valve 18 in the position selected by the reduced pressure of fluid in chamber 24.

The choke 73 is effective to restrict release of fluid under pressure from chamber 24 so that said pressure will not reduce at a rate exceeding the rate of reduction in pressure of fluid in chamber 25 by operation of the valve device 27. Thus immediately upon piston 23 attaining the position corresponding to the reduction in pressure of fluid in chamber 24, as governed by the position of lever 115 in the operator's control valve device 2, the pressure of fluid in chamber 25 will be sufficiently reduced to substantially balance the opposing forces on said piston to permit stopping of said piston and thereby of the diaphragm valve 18 in a position corresponding substantially to that of the operator's control lever 115. If the operator desires to open the diaphragm valve 18 to a greater degree, he will move lever 115 further in the direction of its maximum pressure position, and the motor 1 will operate to correspondingly change the position of said valve as will be apparent from the above description.

It will now be noted that by suitable adjustment of the operator's control lever 115 to either extreme position, or to any selected intermediate position, the power motor 1 will act to correspondingly position the diaphragm valve 18 with respect to its seat 19.

If the diaphragm valve 18 is in contact with its seat or in a partially open position and the supply of fluid under pressure in pipe 3 is lost, as due to rupture of said pipe, the pressure of fluid in the motor piston chamber 24 will unseat the supply valve 101 in the operator's control device 2 against the light force of biasing spring 104 and then be substantially dissipated through the ruptured pipe. At the same time, the supply valve 54 in the valve device 27 may be blown from its seat by pressure of fluid in the motor piston chamber 25 and permit dissipation of such fluid through the ruptured pipe. Under such a condition the pressure of fluid in the inlet opening 16 would push the diaphragm valve 18 to its fully open position. In case the diaphragm valve 18 were in its fully open position at the time of loss of fluid under pressure from the supply pipe it would tend to remain in said position. It is however desired that the power piston 23 be moved to its opposite or valve closing position, or be maintained in said position, automatically in case of failure of the supply of fluid under pressure to the supply pipe 3, due for instance to rupture thereof.

In order to insure automatic operation of the power piston 23 to its valve closing position in case of failure of the fluid under pressure in pipe 3, regardless of the degree of opening of diaphragm valve 18 or to insure that said diaphragm valve will remain in its closed position in case of failure of the supply of fluid under pressure in pipe 3, the safety reservoir 7 and the safety valve device 9 are provided.

The safety reservoir 7 is normally charged with fluid under pressure from the supply pipe 3 through the check valve device 8, said check valve device being provided to retain the fluid under pressure in said reservoir in case of rupture of pipe 3 or loss of fluid under pressure therefrom. The safety reservoir 7 is connected by a pipe 74 to the safety valve device 9.

The safety valve device 9 comprises (Fig. 3) a casing containing a flexible diaphragm 75 having at one side a chamber 76 open to the fluid pressure supply pipe 3. At the opposite side of diaphragm 75 is a chamber 77 which is open to atmosphere through a port 78 and which contains a follower 79 engaging the diaphragm 75. A shoulder 80 in the casing is provided for contact with the follower 79 to limit deflection of diaphragm 75 by pressure of fluid in chamber 76. A spring 81 in chamber 77 acts on diaphragm follower 79 to oppose pressure of fluid in chamber 76.

The follower 79 is provided with a stem 82 extending through a bore provided in a wall 83 in the casing into a chamber 84 which is connected to pipe 74 from the safety reservoir 7, and within said bore the stem 82 is provided with an annular recess containing a sealing ring 118 having sealing contact with the wall of said bore to prevent leakage of fluid under pressure from chamber 84 to chamber 77 and thence to atmosphere through port 78. The stem 82 is connected in chamber 84 to a fluid pressure supply valve 85 having a fluted stem 86 which is slidably mounted in a bore 87 extending through a sleeve-like member 88 which is slidably mounted in a bushing 89. A seat for the supply valve 85 is provided on one end of the sleeve-like member 88 around the bore 87. The sleeve-like member 88 carries a portion 90 of smaller diameter than the bore in bushing 89, and said portion extends into a chamber 91 wherein it is provided with a release valve 92 arranged to cooperate with a seat on the adjacent end of said bushing. The bore 87 in sleeve-like member 88 is connected by a bore 93 to chamber 91. Between the sleeve-like member 88 and valve 92 and encircling the reduced portion 90 is an annular chamber 94 which is connected through one or more ports 95 to an annular chamber 96 encircling the bushing 89. Chamber 96 is in constant communication with atmosphere through a port 97. Chamber 91 is connected to pipe 12 leading to the double check valve 10 and contains a spring 98 acting on the valve 92 for urging it into contact with its seat.

In operation, when the fluid pressure supply pipe 3 is charged with fluid at a suitable pressure, such pressure effective in diaphragm chamber 76 will deflect the diaphragm 75 and move the diaphragm follower 79 and stem 82 to the position in which they are shown in Fig. 3 and which is defined by contact between said follower and the casing shoulder 80. In this position of the diaphragm stem 82 the supply valve 85 will be moved against its seat on the end of the sleeve-like member 88 which in turn will be shifted to a position for opening the release valve 92. With the release valve 92 open, pipe 12 and thereby the connected end of the double check valve 10 will be open to atmosphere past said valve and through the port 97, whereby the double check valve 10 will be rendered operative by fluid under pressure supplied to pipe 11 by the operator's control device 2 to establish communication between said pipe and pipe 13 and to close communication between pipes 13 and 12. With valve 85 closed fluid supplied from the safety reservoir 7 through pipe 74 to chamber 84 will be prevented from flowing therefrom. Thus when the fluid pressure supply pipe 3 is supplied with fluid under pressure, the safety reservoir 7 will also be charged with fluid under pressure and the parts of the valve device 3 will be in the position shown in the drawing preventing use of fluid under pressure from said reservoir, and rendering the double check valve 10 effective to permit control of the fluid motor 1 by the operator's control device 2 as hereinbefore described.

Now let it be assumed that the supply of fluid to the supply pipe 3 is lost. The pressure of fluid in diaphragm chamber 76 will then be dissipated and permit spring 81 to move the diaphragm 75, the follower 79 and the follower stem 82 in an upwardly direction to a position which may be defined by contact between said diaphragm and a raised part 99 in the casing. When the follower stem 82 is moved by spring 81 as just mentioned, the supply valve 85 will move with said stem, as will also the sleeve-like member 88 and release valve 92 under the influence of spring 98, until said release valve contacts its seat to close communication between pipe 12 and the atmospheric port 97. After the release valve 92 seats, further movement of the diaphragm follower stem 82 and the supply valve 85 by spring 81 will then pull said valve out of contact with its seat and establish communication between chamber 84 and bore 87 which is open through bore 93 to chamber 91. Fluid under pressure in the safety reservoir 7 will then flow past the supply valve 85 to chamber 91 and thence through pipe 12 to the double check valve 10. The pressure of fluid thus provided to act on the double check valve 10 will then shift said check valve to its opposite position for closing communication between pipes 11 and 13 and for opening pipe 13 to pipe 12, whereupon fluid under pressure from the safety reservoir will flow to chamber 24 above the power piston 23 and actuate said piston to move the diaphragm valve 18 into contact with its seat 19. It will thus be evident that upon loss of fluid under pressure from the supply pipe 3 movement of the power piston 23 to the extreme position opposite that in which it is shown in the drawing for closing the diaphragm valve 18 is insured by operation of the safety valve device 9 to connect the safety reservoir 7 to the fluid motor 1.

*Summary*

It will now be seen that I have provided a control apparatus embodying a fluid motor which is adjustable by fluid pressure to any selected position for correspondingly positioning a device operatively connected to said motor, in accordance with selected operation of an operator's control device which may be located at a station remote from said motor. The apparatus also includes means which is automatically operative in case of loss of the supply of fluid pressure to insure operation of the motor to effect a selected operation of the device being controlled.

Having now described my invention, what I claim as new and desire to secure by Letters Patent is:

1. In combination, a fluid motor comprising a casing, a power member in said casing, said casing having at one side of said power member a control chamber, a source of fluid under pressure, an operator's control device operable to establish communication between said source of fluid pressure and said control chamber to supply fluid under pressure to said control chamber for moving said power member from one position to another position, and also operable to release fluid under pressure from said control chamber, means operable to effect movement of said power member from said other position to said one position upon release of fluid under pressure from said control chamber, a safety reservoir connected to said source of fluid under pressure and normally charged with fluid under pressure therefrom, a check valve in the communication between said reservoir and source for preventing any reverse flow of fluid under pressure through said communication, valve means separate from said check valve controlling communication between said safety reservoir and control chamber, means operable by fluid under pressure in said source to actuate said valve means to close said communication, and means operable upon loss of fluid under pressure in said source to actuate said valve means to open said communication for supplying fluid under pressure from said safety reservoir to said control chamber to move said power member to said other position.

2. In combination, a fluid motor comprising a casing, a power member in said casing, said casing providing a control chamber at one side of said member, a source of fluid under pressure, an operator's self-lapping control valve device operable to establish communication between said source of fluid under pressure and said control chamber for supplying fluid under pressure to said control chamber to move said power member from one position to another position, and being also operable to release fluid under pressure from said control chamber, means operable to effect movement of said power member from said other position to said one position upon release of fluid under pressure from said control chamber, a safety reservoir connected to and normally charged with fluid under pressure from said source, a check valve in the communication between said reservoir and source for preventing any reverse flow of fluid under pressure through said communication, valve means separate from said check valve controlling communication between said safety reservoir and control chamber, means operable by fluid under pressure in said source to actuate said valve means to close the respective communication, means operable upon loss of fluid under pressure in said source to actuate said valve means to open the respective communication for supplying fluid under pressure from said safety reservoir to said control chamber to move said power member to said other position, and a double check valve arranged in the communication between said operator's control device and said valve means and said control chamber, and operable automatically by fluid under pressure supplied by operation of said operator's valve device to close communication between said control chamber and said valve means and operable automatically by fluid under pressure supplied by said valve means to close communication between said chamber and said operator's control device.

JAMES A. CAMPBELL.

REFERENCES CITED

The following references are of record in the file of this patent:

UNITED STATES PATENTS

| Number | Name | Date |
| --- | --- | --- |
| 826,979 | Wilkinson | July 24, 1906 |
| 1,250,040 | Smeltzer | Dec. 11, 1917 |
| 2,177,098 | Doe | Oct. 24, 1939 |
| 2,232,883 | Neveu | Feb. 25, 1941 |
| 2,244,384 | Bissinger | June 3, 1941 |
| 2,251,729 | Bach | Aug. 5, 1941 |
| 2,253,663 | Tweedale | Aug. 26, 1941 |
| 2,376,671 | Dodson | May 22, 1945 |
| 2,401,680 | Eaton | June 4, 1946 |

FOREIGN PATENTS

| Number | Country | Date |
| --- | --- | --- |
| 459,893 | Great Britain | Jan. 18, 1937 |
| 314,882 | Germany | Mar. 22, 1921 |